(12) United States Patent
Chen et al.

(10) Patent No.: US 8,927,165 B2
(45) Date of Patent: Jan. 6, 2015

(54) STACK CATHODE INLET RH (RELATIVE HUMIDITY) CONTROL WITHOUT RH SENSING DEVICE FEEDBACK

(75) Inventors: Dongmei Chen, Auston, TX (US); Victor W. Logan, Naples, NY (US); Matthew C. Kirklin, Coleman, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 821 days.

(21) Appl. No.: 12/825,060

(22) Filed: Jun. 28, 2010

(65) Prior Publication Data

US 2011/0318663 A1   Dec. 29, 2011

(51) Int. Cl.
| | | |
|---|---|---|
| *H01M 8/04* | (2006.01) | |
| *H01M 8/06* | (2006.01) | |
| *H01M 8/00* | (2006.01) | |
| *H01M 16/00* | (2006.01) | |
| H01M 2/00 | (2006.01) | |
| H01M 10/48 | (2006.01) | |
| H01M 8/10 | (2006.01) | |

(52) U.S. Cl.
CPC ...... *H01M 8/04223* (2013.01); *H01M 8/04619* (2013.01); *H01M 8/0494* (2013.01); *H01M 16/003* (2013.01); H01M 2008/1095 (2013.01); Y02E 60/50 (2013.01)
USPC .............. 429/429; 429/61; 429/90; 429/400; 429/413; 429/428

(58) Field of Classification Search
CPC .................... H01M 8/04223; H01M 8/04619; H01M 8/0494; H01M 16/003; Y02E 60/50
USPC ............ 429/61, 90, 400, 408, 413, 428, 429, 429/431
See application file for complete search history.

(56) References Cited

U.S. PATENT DOCUMENTS

| | | | |
|---|---|---|---|
| 2006/0263654 A1* | 11/2006 | Goebel et al. | 429/13 |
| 2008/0299420 A1* | 12/2008 | Kelley et al. | 429/13 |
| 2009/0081489 A1* | 3/2009 | Frost et al. | 429/13 |

OTHER PUBLICATIONS

Real Dictionary © 2001, Commercially accesable May 26 2003, {http://www.realdictionary.com/?q=incomprehensible}.*

* cited by examiner

*Primary Examiner* — Patrick Ryan
*Assistant Examiner* — Aaron Greso
(74) *Attorney, Agent, or Firm* — John A. Miller; Miller IP Group, PLC

(57) ABSTRACT

A method for controlling relative humidity (RH) of a cathode side of a fuel cell stack in a fuel cell system that includes an RH sensor on a cathode inlet line for providing an RH signal indicative of the RH of cathode inlet air. If the RH sensor is providing a valid RH signal, the RH signal is calculated as an RH average of the cathode inlet air. When the RH sensor is not providing a valid RH signal, the calculated RH average is utilized to control the cathode inlet air RH. If the RH sensor is not providing a valid signal during start-up, then the stack power is temporarily set at an optimum level for a known cathode inlet air RH.

20 Claims, 3 Drawing Sheets

STACK CATHODE INLET RH (RELATIVE HUMIDITY) CONTROL WITHOUT RH SENSING DEVICE FEEDBACK

BACKGROUND OF THE INVENTION

1. Field of the Invention

This invention relates generally to a system and method for controlling stack cathode inlet relative humidity (RH) and, more particularly, to a system and method for controlling stack cathode inlet RH when RH sensing devices are not functioning properly to prevent improper humidification of the fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, a gas diffusion layer (GDL) that protects the mechanical integrity of the membrane and helps in uniform reactant and humidity distribution. The part of the MEA that separates the anode and cathode flows is called the active area, and only in this area the water vapors can be freely exchanged between the anode and cathode. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates (separators) positioned between the several MEAs in the stack, where the bipolar plates and the MEAs are positioned between two end plates. The bipolar plates include anode side and cathode side flow distributors (flow fields) for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Fuel cell membranes are known to have a water-uptake which is necessary to provide proton conductivity. The water-uptake behavior of fuel cell membranes, however, causes an increase in the volume of the membranes if conditions become more humid or wet and a decrease of the volume if conditions become dryer. Changes in the volume of the cell membranes may cause mechanical stress on the membrane itself and the adjacent fuel cell components. In addition, a membrane that is too wet may cause problems during low temperature environments where freezing of the water in the fuel cell stack could produce ice that blocks flow channels and affects the restart of the system. Membranes that are too dry may have too low of an electrical conductivity at the next system restart that affects restart performance and may reduce stack durability.

It is known in the art to use a water vapor transfer (WVT) unit to capture some of the water in the cathode exhaust gas of a fuel cell stack, and use the water to humidify the cathode input airflow. It is also known in the art to use relative humidity (RH) sensors to monitor the humidification of the cathode input airflow. However, RH sensors can be unreliable and can fail. Therefore, there is a need in the art to provide a method for maintaining an appropriate level of cell membrane humidification when the RH sensors are not functioning properly, as evidenced by invalid RH sensor readings, to improve stack performance by reducing the chance of liquid water occurring, extending the life of the stack membranes and by increasing stack durability.

SUMMARY OF THE INVENTION

In accordance with the teachings of the present invention, a method for controlling relative humidity (RH) of a cathode side of a fuel cell stack in a fuel cell system is disclosed. The fuel cell system includes an RH sensor on a cathode inlet line for providing an RH signal indicative of the RH of cathode inlet air. If the RH sensor is providing a valid RH signal, the RH signal is calculated as an RH average of the cathode inlet air. When the RH sensor is not providing a valid RH signal, the calculated RH average is utilized to control the cathode inlet air RH. If the RH sensor is not providing a valid signal during start-up, then the stack power is temporarily set at an optimum level for a known cathode inlet air RH.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling cathode inlet relative humidity (RH) of a fuel cell or group of fuel cells when an RH sensor is not functioning properly is merely exemplary in nature, and is in no way intended to limit the invention or its applications or uses.

Figure 1:
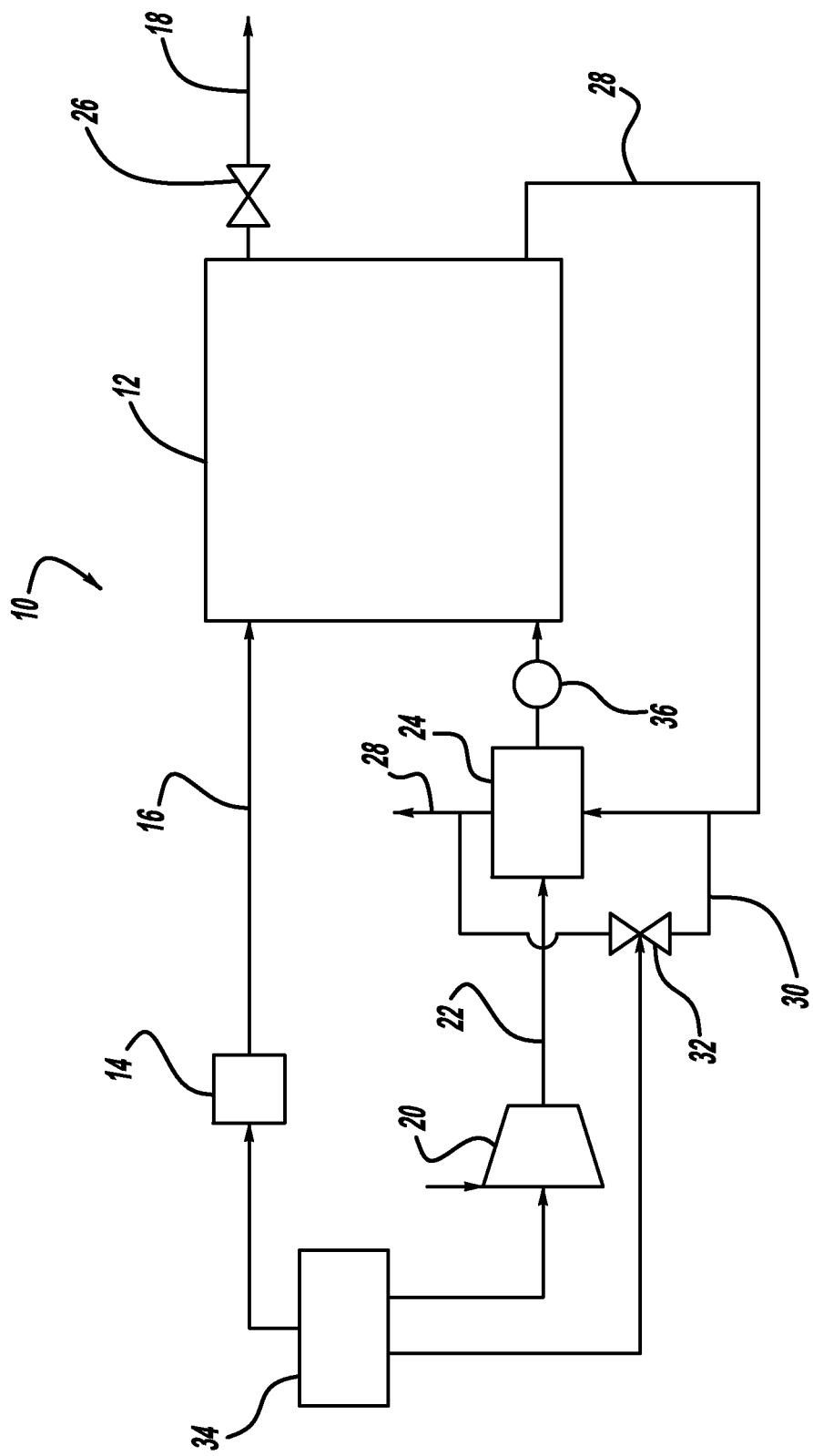
FIG. 1 is a schematic block diagram of a fuel cell system.

FIG. 1 is a schematic block diagram of a fuel cell system 10 including a fuel cell stack 12. The fuel cell stack 12 receives hydrogen from a hydrogen source 14 on an anode input line 16 and provides an anode output on line 18. A bleed valve 26 is provided in the anode exhaust gas line 18 to allow the anode to periodically or continuously bleed an anode effluent, typically nitrogen, from the stack 12. A compressor 20 provides an airflow to the cathode side of the fuel cell stack 12 on a cathode inlet line 22 through a water vapor transfer (WVT) unit 24 that humidifies the cathode inlet air. A relative humidity (RH) sensor 36 in the cathode inlet line 22 measures the RH of the cathode inlet air entering the stack 12. A cathode exhaust gas is output from the stack 12 on a cathode exhaust gas line 28. The exhaust gas line 28 directs the cathode exhaust to the WVT unit 24 to provide the humidity to humidify the cathode inlet air. A by-pass line 30 is provided around the WVT unit 24 to allow the cathode exhaust gas to by-pass the WVT unit 24. A by-pass valve 32 is provided in the by-pass line 30 and is controlled to selectively redirect the cathode exhaust gas through or around the WVT unit 24 to provide the desired amount of humidity to the cathode inlet air.

A battery (not shown) supplies power to various components of the fuel cell system 10, such as the compressor 20. The system 10 also includes a controller 34 that receives RH measurement signals from the RH sensor 36 and controls the speed of the compressor 20, the injection of hydrogen from the hydrogen source 14, and the position of the by-pass valve 32 and the bleed valve 26.

In known systems, when the RH sensor 36 is not functioning properly, i.e., when the RH sensor measurements are not valid, the controller 34 loses its feedback and switches from feedback control to an open loop control. An open loop controller, i.e., a non-feedback controller, uses only a current state and does not use feedback to determine if its input has achieved the desired goal, as is readily apparent to those skilled in the art. Open loop control could lead to improper fuel cell stack 12 humidification, therefore, the following algorithm has been developed according to the present invention to provide an alternative to open loop control when the RH sensor 36 is not functioning properly.

Figure 2A:
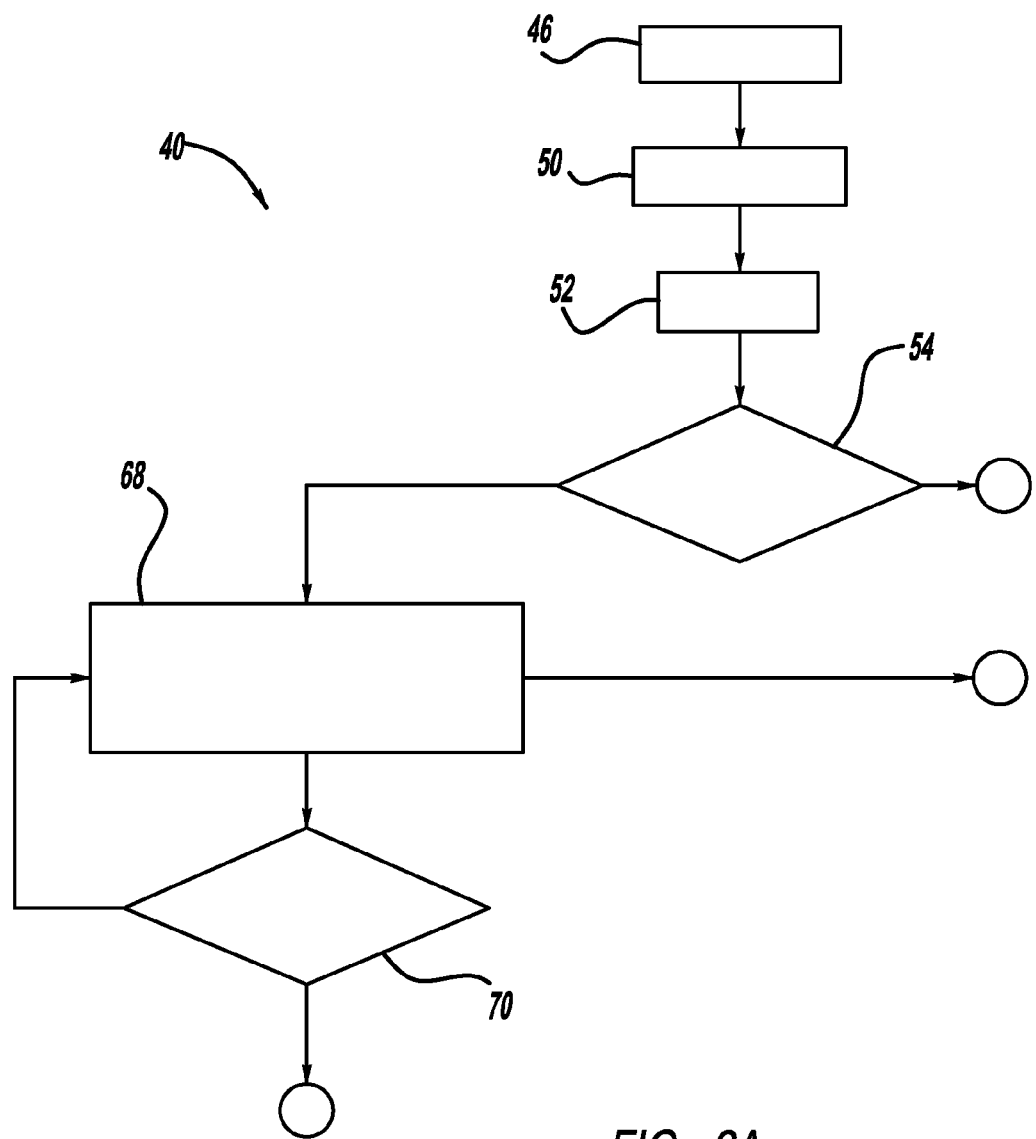
FIGS. 2A and 2B are a flow chart diagram illustrating a method for providing fuel cell stack inlet relative humidity (RH) control during RH sensor malfunction.
Figure 2B:
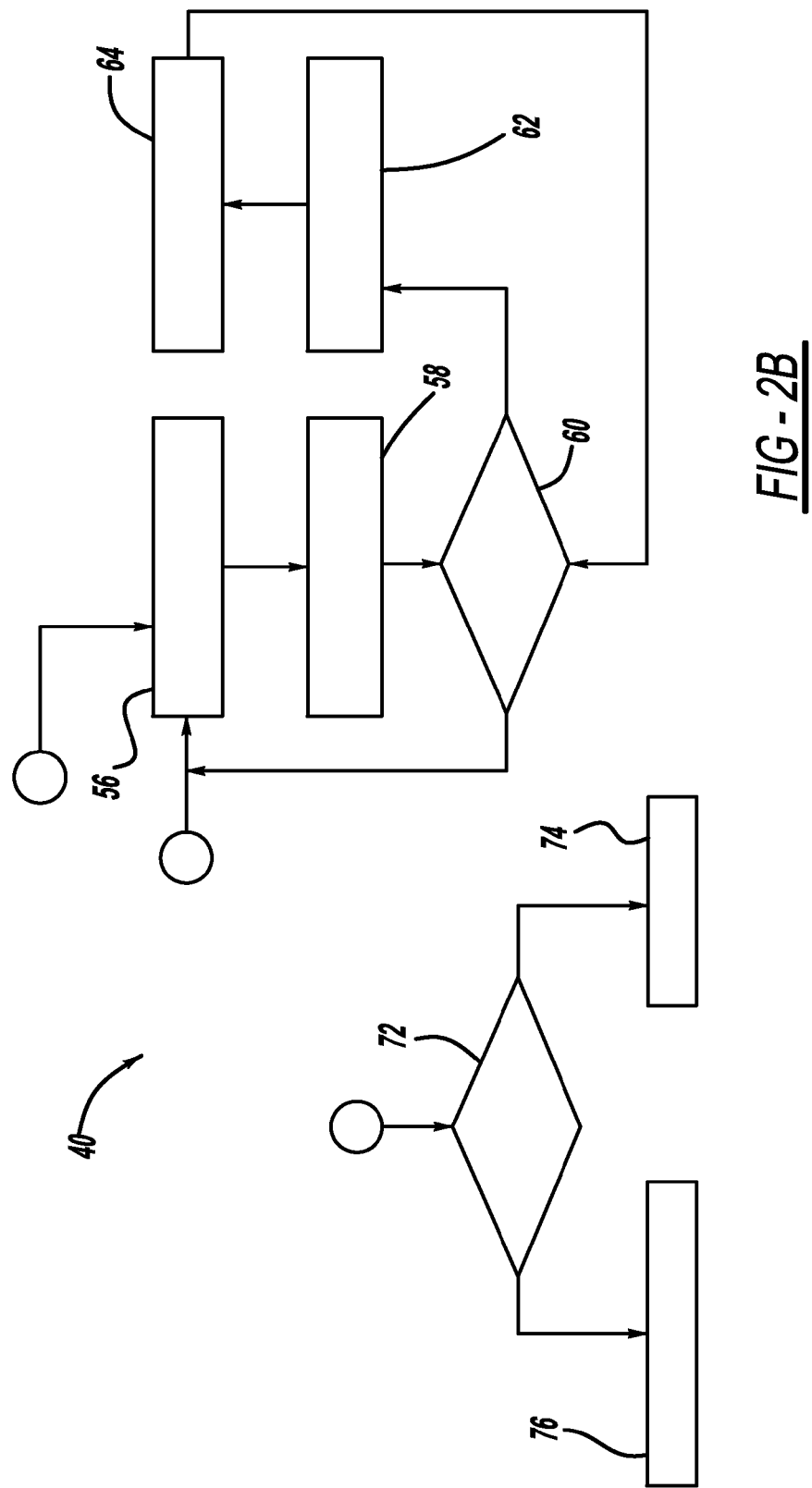

FIG. 2 is a flow diagram 40 for a non-limiting embodiment of an algorithm for controlling the relative humidity (RH) of the cathode inlet air to the fuel cell stack 12. The fuel cell system 10 is started at box 46, and the algorithm provides a system warm-up and other start-up procedures at box 50. After warm-up and other start-up procedures are complete, the fuel cell system 10 enters a normal operating mode or run mode at box 52. After the fuel cell system 10 enters the run mode, or during the start-up procedure, the algorithm determines whether the RH sensor 36 is providing a valid RH value at decision diamond 54. Any suitable algorithm can be used to determine that the reading of the sensor 36 is valid, such as an algorithm that determines whether the sensor reading is a possible value.

If the RH sensor 36 is sensing a valid RH value at the decision diamond 54, the by-pass valve 32 is used to control cathode inlet RH by the controller 34 utilizing feedback from the RH sensor 36 at box 56 to provide closed loop control. While the RH sensor readings are valid, the controller 34 calculates and records the cathode inlet RH average or a filtered average of the sensor measurements over a calibratable period of time that is determined by the sensing signal characteristics of the RH sensor 36 at box 58. In other words, the algorithm calculates an average of the RH measurements within each predetermined time period. The RH average or filtered average value of a previous time period is recorded by the controller 34 at the box 58 and saved in a memory, such as a non-volatile memory.

The algorithm again determines whether the RH sensor 36 is sensing a valid RH value during the run mode at decision diamond 60. If the RH sensor 36 continues sensing a valid RH value at the decision diamond 60, the algorithm returns to the box 56 to continue to control the cathode inlet RH according to the feedback from the RH sensor 36, and the controller 34 continues to calculate and save RH average or filtered average values for each time period at the box 58. If the RH sensor 36 is not sensing a valid RH value at the decision diamond 60, the RH average or filtered average values for the RH sensor 36 of the predetermined time period saved by the controller 34 at the box 58 is retrieved from memory at box 62. The retrieved RH value is used by an RH estimation model to provide an estimated feedback of the cathode inlet RH to the controller 34 at box 64. The algorithm continues to retrieve the RH value from memory at the box 62 and continues to estimate the cathode inlet RH using this value at the box 64 as long as the RH sensor 36 is not reading a valid RH value at the decision diamond 60. If the RH sensor 36 resumes reading a valid RH value at the decision diamond 60, the algorithm returns to the box 56 and controls the cathode inlet RH according to the feedback from the RH sensor 36, as discussed above.

If the RH sensor 36 is not sensing a valid RH value at the decision diamond 54 during the system start-up sequence, then historical cathode inlet RH data does not exist and is not available for the RH estimation model. Therefore, the controller 34 requires that the fuel cell stack 12 operate at a predetermined optimized power level utilizing an open loop cathode inlet RH control. The optimized power level is the level where the stack 12 has the highest relative humidity without liquid water occurring inside the fuel cell stack 12. The optimized power level is determined by the stack design and can be obtained off-line by analysis and experiment. In addition to setting the stack output power to the optimal level, the system control algorithm may initiate remedial actions to cause the sensor 36 to operate properly.

Once the optimized power level for the stack 12 is determined and set at the box 68, the controller 34 adjusts the position of the by-pass valve 32 to set the cathode inlet RH to the desired level corresponding to the optimized power level at box 78. Next, the algorithm determines if a predetermined time period has expired at decision diamond 80. The time period is based on stack characteristics, such as the number of cells in the stack 12, and is used to determine the amount of time the stack may operate properly at the optimized power level, which generally will be a limited and small amount of time. If the time period has not expired at the decision diamond 80, the algorithm determines if the power demand from the stack 12, such as from vehicle operation, is greater than the power generated by the fuel cell stack 12 at the optimized power level at decision diamond 70. If the power demand from the stack 12 is not greater than the power generated by the stack 12 at the optimized power level at the decision diamond 70, meaning more power is being generated by the stack 12 than is necessary to meet the load requirements, the algorithm determines whether the state-of-charge (SOC) of the battery is less than a predetermined charging threshold at decision diamond 72. If the battery SOC is below the predetermined charging threshold at the decision diamond 72, meaning that the battery can accept charge, the battery is charged at box 74 using the additional power generated by the stack 12 operating at the optimized power level, where the difference between the power being generated by the stack and the power being consumed by the loads may need to be small. If the battery SOC is at or above the predetermined charging threshold at the decision diamond 72, the additional power generated by the stack 12 is dissipated to other components of the system 10 or the vehicle in which the system 10 is placed at box 76. For example, the extra power generated by the algorithm can be used to launch the vehicle or can be utilized by other power consumption components, depending on the power management structure of the vehicle. Once the use of the excess power is selected, the algorithm returns to the decision diamond 80 to determine if the time period has expired.

If the power demanded from the stack 12 is greater than the power generated by the stack 12 at the optimized power level at the decision diamond 70, the battery may be used to provide the additional power that is requested above the amount of power generated by the fuel cell stack 12 operating at the optimized power level. The algorithm then returns to the decision diamond 80 to determine if the time period has expired.

Once the time period has expired at the decision diamond 80, the algorithm goes to the box 56 to provide closed loop RH control using the RH value for the optimized power level, which is stored in the memory at the box 58. In addition, the algorithm allows the stack power to be set to the power demand. If the sensor 36 is still reading an invalid signal at the decision diamond 60, then the model uses the stored RH value for the optimized power level at the box 64.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling relative humidity (RH) of a fuel cell stack in a fuel cell system, said method comprising:
   providing an RH sensor on a cathode inlet line that measures the RH of cathode inlet air;
   using an RH estimation model to determine if the RH sensor is providing a valid RH signal at fuel cell system start-up;
   using the RH estimation model to determine if the RH sensor is providing a valid RH signal during a run mode of the fuel cell system;
   calculating an average of the RH signal over a predetermined time period, which is determined by the sensing signal characteristics of the RH sensor, if the RH sensor is providing a valid RH signal during the run mode of the fuel cell system;
   using the calculated average of the RH signal if the RH sensor becomes invalid during the run mode to enable the fuel cell stack to operate utilizing closed-loop cathode inlet RH control;
   operating the fuel cell stack at a predetermined optimized stack power level for a predetermined period of time if the RH signal is invalid at system start-up, wherein the optimized stack power level provides a highest stack relative humidity without liquid water occurring inside the stack; and
   operating the fuel cell stack with closed-loop cathode inlet RH control using the highest stack relative humidity after the predetermined period of time has expired.

2. The method according to claim 1 wherein operating the fuel cell stack at a predetermined optimized stack power level includes comparing the optimized stack power level to a power request from the fuel cell stack.

3. The method according to claim 2 wherein comparing the optimized stack power level to a power request from the fuel cell stack includes charging a system battery if the optimized stack power level is greater than the power request.

4. The method according to claim 3 wherein comparing the optimized stack power level to the power request includes dissipating power in system components if the optimized stack power level is greater than the power request and the battery is at a maximum state of charge.

5. The method according to claim 1 wherein remedial actions are taken if the RH sensor is not providing a valid RH signal.

6. The method according to claim 1 wherein the predetermined period of time is determined by stack characteristics.

7. A method for controlling relative humidity (RH) of a fuel cell stack in a fuel cell system, said method comprising:
   providing an RH sensor on a cathode inlet line to measure the RH of the cathode inlet air;
   using an RH estimation model to determine if the RH sensor is providing a valid RH signal during a run mode of the fuel cell system;
   calculating an average of the RH signal for each consecutive predetermined time period if the RH sensor is providing a valid RH signal during the run mode of the fuel cell system; and
   using the calculated average of the RH signal if the RH signal becomes invalid during the run mode of the fuel cell system to prevent the fuel cell stack from being improperly humidified.

8. The method according to claim 7 wherein the time period for calculating the RH average is determined by the sensing signal characteristics of the RH sensor.

9. The method according to claim 7 further comprising operating the fuel cell stack at a predetermined optimized stack power level for a predetermined period of time if the RH signal is invalid at system start-up to provide a predetermined RH of the cathode inlet air.

10. The method according to claim 9 wherein operating the fuel cell stack at a predetermined optimized stack power level includes comparing the optimized stack power level to a power request from the fuel cell stack.

11. The method according to claim 10 wherein comparing the optimized stack power level to a power request from the fuel cell stack includes charging a system battery if the optimized stack power level is greater than the power request.

12. The method according to claim 11 wherein comparing the optimized stack power level to the power request includes dissipating power in system components if the optimized stack power level is greater than the power request and the battery is at a maximum state of charge.

13. The method according to claim 9 wherein the predetermined period of time for operating the fuel cell stack at a predetermined optimized stack power level is determined by stack design.

14. A method for controlling relative humidity (RH) of a fuel cell stack in a fuel cell system, said method comprising:
   providing an RH sensor on a cathode inlet line that measures the RH of the cathode inlet air;
   using an RH estimation model to determine if the RH sensor is providing a valid RH signal at fuel cell system start-up; and
   operating the fuel cell stack at a predetermined optimized power level for a predetermined period of time if the RH signal is invalid at system start-up, wherein the optimized stack power level provides a known cathode inlet RH.

15. The method according to claim 14 further comprising operating the fuel cell stack with closed-loop cathode inlet RH control using the known cathode inlet RH after the predetermined period of time has expired.

16. The method according to claim 14 wherein operating the fuel cell stack at a predetermined optimized stack power level includes comparing the optimized stack power level to a power request from the fuel cell stack, and comparing the optimized stack power level to a power request from the fuel cell stack includes charging a system battery if the optimized stack power level is greater than the power request.

17. The method according to claim 16 wherein comparing the optimized stack power level to the power request includes dissipating power in system components if the optimized stack power level is greater than the power request and the battery is at a maximum state of charge.

18. The method according to claim 14 wherein the predetermined period of time is determined by stack characteristics.

19. The method according to claim 14 wherein an average of the RH signal is calculated for each consecutive predetermined time period if the RH sensor is providing a valid RH signal during start-up and during a run mode of the fuel cell system.

20. The method according to claim 19 wherein the calculated average of the RH signal is used if the RH signal becomes invalid to prevent the fuel cell stack from being improperly humidified.

* * * * *